(12) United States Patent
Phan Huy et al.

(10) Patent No.: US 11,973,619 B2
(45) Date of Patent: Apr. 30, 2024

(54) METHOD FOR TRANSMITTING PILOT SYMBOLS

(71) Applicant: ORANGE, Paris (FR)

(72) Inventors: Dinh Thuy Phan Huy, Chatillon (FR); Raphaël Visoz, Chatillon (FR); Philippe Ratajczak, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 393 days.

(21) Appl. No.: 17/288,226

(22) PCT Filed: Oct. 22, 2019

(86) PCT No.: PCT/FR2019/052503
§ 371 (c)(1),
(2) Date: Apr. 23, 2021

(87) PCT Pub. No.: WO2020/084244
PCT Pub. Date: Apr. 30, 2020

(65) Prior Publication Data
US 2021/0392018 A1 Dec. 16, 2021

(30) Foreign Application Priority Data
Oct. 25, 2018 (FR) ...................................... 1859882

(51) Int. Cl.
*H04B 17/12* (2015.01)
*H04B 1/18* (2006.01)
(Continued)

(52) U.S. Cl.
CPC ........ *H04L 25/0224* (2013.01); *H04L 5/0048* (2013.01); *H04L 25/0204* (2013.01)

(58) Field of Classification Search
None
See application file for complete search history.

(56) References Cited

U.S. PATENT DOCUMENTS 7,855,604 B1 * 12/2010 Wei ..................... H03F 3/45183
330/207 P
2015/0178529 A1 * 6/2015 Theurer ................. G16H 40/67
340/10.1

(Continued)

OTHER PUBLICATIONS

English Translation of Written Opinion of the International Searching Authority dated Jan. 15, 2020 for corresponding International Application No. PCT/FR2019/052503, filed Oct. 22, 2019.

(Continued)

*Primary Examiner* — Sai Aung
(74) *Attorney, Agent, or Firm* — David D. Brush; Westman, Champlin & Koehler, P.A.

(57) ABSTRACT

A method of transmitting, by a first device, pilot symbols to allow a second device to estimate a transmission channel between the first and second devices. The first device has a first antenna that is active in transmission and a second antenna that is passive in transmission. The method includes: transmitting, by the first active antenna, a signal conveying pilot symbols associated with the first active antenna, and during which the second passive antenna is set to a transparency impedance to obtain a level of signal backscattered by the second passive antenna less than a first threshold; and transmitting by the first active antenna a signal conveying pilot symbols associated with the second passive antenna, and during which the second passive antenna is set to a scattering impedance to obtain a level of signal backscattered by the second passive antenna greater than a second threshold greater than the first threshold.

15 Claims, 2 Drawing Sheets

(51) Int. Cl.
*H04L 5/00* (2006.01)
*H04L 25/02* (2006.01)

(56) References Cited

U.S. PATENT DOCUMENTS

| | | | | |
|---|---|---|---|---|
| 2015/0179053 | A1* | 6/2015 | Good | A61B 5/6892 |
| | | | | 340/539.15 |
| 2016/0092762 | A1* | 3/2016 | Dhayni | G06K 19/0726 |
| | | | | 235/492 |
| 2018/0062774 | A1* | 3/2018 | Blandino | H04B 17/17 |
| 2018/0076876 | A1* | 3/2018 | Gerszberg | H04L 41/0668 |
| 2018/0123706 | A1* | 5/2018 | Henry | H04B 17/318 |
| 2018/0331581 | A1* | 11/2018 | Hosseini | H02J 7/0042 |
| 2021/0392018 | A1* | 12/2021 | Phan Huy | H04L 5/0048 |

OTHER PUBLICATIONS

Huynh N. et al., "Ambient Backscatter Communications: A Contemporary Survey", Networking and Internet Architecture, arXiv:1712.04804v1 [cs.NI], dated Dec. 13, 2017.

International Search Report dated Jan. 7, 2020 for corresponding International Application No. PCT/FR2019/052503, dated Oct. 22, 2019.

Written Opinion of the International Searching Authority dated Jan. 7, 2020 for corresponding International Application No. PCT/FR2019/052503, filed Oct. 22, 2019.

French Search Report dated Jun. 12, 2019 for corresponding French Application No. 1859882, filed Oct. 25, 2018.

Yang Gang et al. "Multi-antenna Wireless Energy Transfer for Backscatter Communication Systems" IEEE Journal on Selected Areas in Communications, IEEE Service Center, Piscataway, US, vol. 33, No. 12, Dec. 1, 2015 (Dec. 1, 2015), pp. 2974-2987, [retrieved on Nov. 16, 2015], DOI: 10.1109/JSAC.2015.2481258, XP011590336.

Hsin-Chin Liu et al. "Passive UHF RFID Tag With Backscatter Diversity" IEEE Antennas and Wireless Propagation Letters, IEEE, Piscataway, NJ, US. vol. 10, Jan. 1, 2011 (Jan. 1, 2011), pp. 415-418, DOI: 10.1109/LAWP.2011.2153173, XP011402939.

Yen-Sheng Chen et al. "A Novel Dual-Antenna Structure for UHF RFID Tags" IEEE Transactions on Antennas and Propagation, IEEE Service Center, Piscataway, NJ, US, vol. 59, No. 11, Nov. 1, 2011 (Nov. 1, 2011), pp. 3950-3960, DOI: 10.1109/TAP.2011.2164199, XP011379484.

* cited by examiner

METHOD FOR TRANSMITTING PILOT SYMBOLS

BACKGROUND OF THE INVENTION

The invention relates to the general field of telecommunications and more specifically concerns the estimation of a transmission channel between two wireless communication devices, at least one of which is equipped with a plurality of antennas.

Radio communications systems, such as for example mobile or WiFi (Wireless Fidelity) networks, now increasingly rely on multi-antenna wireless communication devices (e.g. terminals, base stations etc.) To allow an emitter device equipped with one or more antennas to deliver a message to a receiver device equipped with a plurality of antennas with high spectral efficiency, it is conventional to use at the emitter device a precoding technique implementing beamforming, making it possible to simultaneously transport several data flows on the same frequencies. Known examples of precoding techniques include eigenbeamforming or beamforming of MRT (Maximum Ratio Transmission), ZF (Zero Forcing), or SVD (Singular Value Decomposition) type.

When such precoding techniques are used for emission, the inter-flow interference at the receiver device is theoretically zero, which makes it possible to simplify the reception scheme applied by the receiver device, which then simply consists in equalizing the transmission channel between the emitter device and the receiver device seen by each of the flows independently. To determine the coefficients of the precoder (or in an equivalent manner, of the precoding matrix) to be applied to the data symbols intended to be transmitted to the receiver device, it is necessary for the emitter device to know and therefore estimate the transmission channel separating it from the receiver device (and more precisely, the transmission channel separating each antenna of the emitter device from each antenna of the receiver device.)

In communication systems implementing a Time Division Duplex (TDD) mode, it is allowed that the transmission channel between the emitter device and the receiver device can be considered as reciprocal: in other words, the transmission channel in the emitter device to receiver device direction is considered as identical to the transmission channel in the receiver device to emitter device direction. To allow the emitter device to estimate the transmission channel separating each of its antennas from the antennas of the receiver device, the receiver device sends to the emitter device, from each of its antennas, signals conveying predefined pilot symbols, known to the emitter device. Note that no limitation is attached to the multiplexing technique used by the receiver device to send these signals: it can a time-domain, frequency-domain, code-based multiplexing technique etc. interchangeably. The emitter device then estimates, on the basis of the pilot symbols it has received, the transmission channel in the receiver device to emitter device direction, then it makes use of the reciprocity of the channel to determine the coefficients of the precoder to be used for transmission, according to the modulation and encoding to be applied (where applicable for each data flow if there are several to be transmitted simultaneously). The emitter device then transmits its data using the precoder thus determined.

This operating principle requires the receiver device to emit signals conveying pilot symbols from each of its antennas. For this purpose, two configurations of the receiver device may be envisaged.

According to a first configuration, the receiver device is equipped with several RF (Radio Frequency) transmission lines, as many as there are antennas, each RF emission comprising a generator of RF waves generally combined with an RF amplifier. However, such an RF amplifier is an expensive and energy-consuming component. The use of several RF emission lines for a receiver device such as for example a wireless terminal may therefore be problematic in terms of cost and autonomy of the terminal battery.

A second configuration consists in equipping the receiver device with a single RF emission line and in alternatively toggling each of the emitter antennas onto this emission line by means of a switch. The drawback of such a configuration is that it induces a so-called insertion loss of the switch which can reduce the emissive power by a few dB. Furthermore, it can disrupt the emission of the data taking place at the same time as the emission of the pilot symbols, the transmission channel seen by the data varying considerably with each switching to a new antenna.

It should be noted that, although they are described in a precoding context, the aforementioned drawbacks are also encountered in other contexts in which the estimation of a transmission channel between an emitter device and a multi-antenna receiver device is required for emission, such as for example in guiding or location.

SUBJECT AND SUMMARY OF THE INVENTION

The invention notably makes it possible to palliate these drawbacks by proposing a method of transmission, by a first communication device, of pilot symbols intended to allow a second communication device to estimate a transmission channel between the first and the second communication device, the first communication device comprising a first antenna configured so as to be active in transmission and at least a second antenna configured so as to be passive in transmission. In accordance with the invention, the transmission method comprises:

- a step of transmission, by the first active antenna, of at least one signal conveying pilot symbols associated with said first active antenna, and during which said at least one second passive antenna is set to a so-called transparency impedance, said transparency impedance being chosen so as to obtain a level of signal backscattered by said at least one second passive antenna less than a first threshold; and
- at least one step of transmission by the first active antenna of at least one signal conveying pilot symbols associated with said at least one second passive antenna, and during which said at least one second passive antenna is set to a so-called scattering impedance chosen so as to obtain a level of signal backscattered by said at least one second passive antenna greater than a second threshold greater than the first threshold.

Correspondingly, the invention also concerns a communication device, the so-called first communication device, configured to transmit pilot symbols intended to allow a second communication device to estimate a transmission channel between the first and the second communication device, the first communication device comprising a first antenna configured so as to be active in transmission and at least one second antenna configured so as to be passive in transmission, the first active antenna being further configured to:

transmit at least one signal conveying pilot symbols associated with said first active antenna, said at least one second passive antenna being then set to a so-called transparency impedance, this transparency impedance being chosen so as to obtain a level of signal backscattered by said at least one second passive antenna less than a first threshold; and transmit at least one signal conveying pilot symbols associated with said at least one second passive antenna, said at least one second passive antenna being then set to a so-called scattering impedance chosen so as to obtain a level of signal backscattered by said at least one second passive antenna greater than a second threshold greater than the first threshold.

The invention also concerns a method of estimation of a transmission channel between a first multi-antenna communication device and a second communication device, said method being intended to be implemented by the second communication device and comprising, for at least one antenna of the second communication device;

a step of reception by said at least one antenna of a plurality of signals transmitted in accordance with a method of transmission according to the invention by the first communication device and conveying pilot symbols; and a step of estimation of the transmission channel between the antennas of the first device and said antenna of the second communication device using the pilot symbols conveyed by said received signals.

No limitation is attached to the algorithm used by the second communication device to carry out the estimation of the transmission channel. It can for example be an LMMSE (Linear Minimum Mean Square Error) algorithm.

The term "pilot symbols associated with an antenna of the first communication device" is understood to mean the pilot symbols that are intended to be used by the second communication device to estimate the transmission channel between each of its antennas and the antenna in question of the first communication device.

Moreover, an antenna that is "active in transmission" is understood to mean an antenna connected to an RF emission line comprising an RF wave generator that emits RF waves, and where applicable an RF amplifier. Contrariwise, an antenna that is "passive in transmission" is an antenna that is not connected to such an emission line, and in particular to an RF wave generator.

It should be noted that no limitation is attached to the nature of the communication devices under consideration, even though the invention has a preferred application when the second communication device is a wireless terminal such as for example a mobile telephone, a laptop computer etc., with limited autonomy. The invention can thus be applied to any type of communication device (terminal, base station, etc.) comprising one or more antennas, these antennas being able to be co-located or distributed across different geographical locations.

Furthermore, no limitation is attached to the use that is made of the estimation of the transmission channel obtained owing to the invention. This can be used as previously stated, to determine the coefficients of a precoder to be applied at the second communication device, but it can also be applied to other contexts such as for example for applications of guiding, locating, antenna selection etc.

The invention thus proposes a solution allowing the estimation of the transmission channel between a first multi-antenna communication device and a second communication device which on the one hand, relies on the transmission via a single antenna of the first communication device classified as "active" (the other antennas being considered as passive) of the signals conveying the pilot symbols needed for the estimation and associated with the different antennas of the first communication device, and on the other hand, makes use of the "ambient" backscattering of these signals by the other antennas of the first communication device which are themselves passive.

Ambient backscattering is a known technique, particularly described in the document by N. Van Huynh et al. titled "Ambient Backscatter Communications: A Contemporary Survey", Networking and Internet Architecture (see NI), December 2017. It allows an emitter to make use of existing RF signals, such as for example radio, television, or mobile phone signals, to transmit data to a receiver without emitting an additional radio wave. For this purpose the transmitter modifies (modulates) the radio waves coming from ambient sources (television towers, radio stations etc.) and reflects them toward the receiver; the receiver then detects the modifications made by the transmitter and extracts the data carried by these modifications.

The invention advantageously makes use of this principle to transport pilot sequences allowing the estimation of a multi-antenna channel between two communication devices. A single antenna is activated for transmission at the first communication device, and the pilot sequences allowing the estimation of the transmission channel between all the antennas of the first communication device and that (or those) of the second communication device are transmitted by this single active antenna. The multiplexing used to transmit the different pilot sequences can be interchangeably time-domain multiplexing (i.e. the pilot sequences associated with the different antenna are transmitted successively during distinct time intervals), frequency-domain multiplexing (i.e. the pilot sequences associated with the different antennas are transmitted at different frequencies) or time and frequency multiplexing.

When the active antenna of the first communication device transmits the pilot sequence that is associated with it (i.e. which allows the estimation of the channel between this antenna and that (or those) of the second communication device), the other antennas of the first communication device are maintained in a state wherein the signal level that they are liable to backscatter from the wave emitted by the active antenna is negligible or even minimal (less than a first threshold). In this way, the second communication device receives "only" the incident wave carrying the pilot sequence that it receives from the active antenna with a sufficient signal level to be able to be detected by the second communication device (i.e. greater than a second threshold, itself greater than the first threshold). The signal received by the second communication device hence contains the contribution of the transmission channel between the antenna or antennas of the second communication device and the active antenna, but also the contribution of the transmission channel between the antenna or antennas of the second communication device and the passive antenna with which the transmitted pilot sequence is associated, which allows the second communication device, via an appropriate estimation algorithm, to estimate the transmission channel between the second communication device and this passive antenna.

Note that the concept of thresholds of the backscattered signal level may be implicit, for example when the scattering impedance is chosen such as to maximize the backscattered signal level and the transparency impedance is chosen so as to minimize this signal level. Specifically, it is always possible in both these special cases to arbitrarily determine a second threshold and a first threshold within the meaning of the invention.

The invention is therefore distinguished by a conventional ambient backscattering as described in the document by N. Van Huynh et. al. in that it proposes a method wherein the source of the RF waves, namely the active antenna of the first communication device, knows of the existence of the "backscatterers", namely the passive antennas of the first communication device, and adapts what it transmits as a function of the latter. In accordance with the invention, the configuration of the active and passive antennas of the first communication device is conducted jointly so as to allow the second communication device to make an estimate of the transmission channel that separates it from the first communication device.

By making use of the backscattering principle in this way, the invention offers an inexpensive solution that also leads to reduced energy consumption to allow the estimation of a multi-antenna transmission channel. A single RF emission chain is necessary at the first communication device despite the presence of multiple antennas. Furthermore, useful data can be transmitted jointly with the sequences of pilot symbols without the latter being affected by a change of transmission channel.

No limitation is attached to the number of antennas of the first communication device. The first communication device can in particular comprise more than two antennas, and therefore more than one passive antenna.

In this embodiment comprising several passive antennas, during said at least one transmission step, the passive antennas of the first communication device are set such that a single passive antenna backscatters both during one and the same time interval and within one and the same determined frequency band.

In this way, it is assured that the interference coming from the other antennas of the first communication device will be minimized, which facilitates the estimation of the transmission channel by the second communication device on the basis of the backscattered signals that it receives.

For this purpose, in a particular embodiment wherein the first communication device comprises a plurality of passive antennas, when during a transmission step, the first active antenna transmits said at least one signal conveying the pilot symbols associated with one of said passive antennas, the other passive antenna or antennas of the first communication device are set to their transparency impedances.

As mentioned previously, different types of multiplexing can be envisioned to transmit the pilot symbols associated with the different antennas of the first communication device.

Thus, according to a particular embodiment, the signals conveying the pilot symbols associated with said passive antennas are transmitted by the first active antenna during separate time intervals.

This embodiment concerns time-domain multiplexing of the pilot symbols.

As a variant, it is possible to envision frequency-domain multiplexing (i.e. the signals conveying the pilot symbols associated with said passive antennas are transmitted by the first active antenna on separate frequency bands), or else time and frequency multiplexing.

Thus, in a particular embodiment, at least two signals conveying pilot symbols associated with two distinct passive antennas are transmitted by the first active antenna in separate frequency bands. Furthermore, in this embodiment, said at least two signals can then be transmitted by the first active antenna during overlapping time intervals or on the contrary during separate time intervals.

In a particular embodiment, the pilot symbols transmitted by the first active antenna are chosen such as to limit or minimize a level of estimation noise of the transmission channel at the second communication device.

This embodiment makes it possible to facilitate and optimize the estimation of the transmission channel on the basis of the signals received by the second communication device including the signals backscattered by the passive antennas of the first communication device.

Thus, for example, in a particular embodiment, the pilot symbols transmitted by the first active antenna are chosen such that, if A denotes a matrix of dimensions T×N, where N is the number of antennas of the first communication device, T is the total number of pilot symbols transmitted by the first active antenna associated with the N antennas of the first communication device, and said matrix A contains in a column the T pilot symbols transmitted by the first active antenna and in its other column or columns the pilot symbols backscattered by said at least one second passive antenna, the matrix $A^1 A$ is invertible, [1] denoting the Hermitian operator.

In this embodiment, to minimize the estimation noise at the receiver, the pilot symbols transmitted by the first antenna can be chosen, particularly in such a way as to minimize the trace of the inverse matrix of the matrix $A^1 A$.

This embodiment is advantageous, particularly when the second communication device does not have knowledge of the covariance of the noise and of the interference, or the covariance of the transmission channel.

As mentioned previously, the setting of the passive antennas is done by adjusting the impedances to which they are set in such a way that the level of the signal backscattered by these antennas is greater than a threshold or even maximal, or on the contrary less than a threshold or even minimal. Note that the impedances can vary from one passive antenna to the other and particularly depend on the shape of the passive antenna, its size etc.

In a particular embodiment, the transparency impedance of at least one passive antenna of the first communication device is chosen equal to the matching impedance of this passive antenna.

This choice makes it possible to minimize the level of the signal backscattered by the passive antenna in question.

In a particular embodiment, the scattering impedance of at least one passive antenna of the first communication device is obtained by linking said passive antenna to a zero or infinite impedance load.

This choice makes it possible to maximize the level of the signal backscattered by the passive antenna in question, particularly for an antenna comprising a ground plane and a suitable RF circuit between the antenna and the ground plane, or a waveguide-type antenna.

Other choices for the scattering and transparency impedances may however be envisioned in a variant, particularly according to the type of antennas under consideration. Thus for example, for antennas powered in differential mode such as dipole type antennas, the scattering impedance may be obtained by linking the passive antenna to an infinite-impedance load, and the transparency impedance to a zero impedance load. Preferably, scattering and transparency impedances are chosen for a passive antenna offering a large separation between the levels of signals backscattered by the passive antenna to allow the estimation of the transmission channel by the second communication device.

For this purpose, in a particular embodiment, the scattering impedance and the transparency impedance of a passive antenna are chosen such that the difference between the level of the signal backscattered by the passive antenna set to its scattering impedance and the level of the signal backscattered by the passive antenna set to its transparency impedance are greater than a level of estimation noise of the transmission channel at the second communication device.

In a particular embodiment, the different steps of the transmission method are determined by computer program instructions.

Consequently, the invention also concerns a computer program on an information medium, this program being able to be implemented in a communication device or more generally in a computer, this program including instructions suitable for implementing the steps of a transmission method as described above.

This program can use any programming language, and be in the form of source code, object code, or intermediate code between source code and object code, such as in a partly compiled form, or in any other desirable form.

The invention also relates to an information or recording medium readable by a computer and including instructions of a computer program as mentioned above.

The information or recording medium can be any entity or device capable of storing the program. For example, the medium may include a storage means, such as a ROM, for example a CD-ROM or a microelectronic circuit ROM, or else a magnetic recording means, for example a hard disk.

Moreover, the information or recording medium can be a transmissible medium such as an electrical or optical signal, which can be routed by an electrical or optical cable, by radio or by other means. The program according to the invention can in particular be downloaded over a network of Internet type.

Alternatively, the information or recording medium can be an integrated circuit in which the program is incorporated, the circuit being suitable for executing or for being used in the execution of the method in question.

According to yet another aspect, the invention concerns a communication system comprising:
  a first multi-antenna communication device according to the invention; and
  a second communication device comprising at least one antenna able to receive a plurality of signals transmitted by the first communication device and conveying pilot symbols, said second communication device further comprising a module of estimation of the transmission channel between the antennas of the first communication device and said antenna of the second communication device configured to use the pilot symbols conveyed by said received signals.

The estimation method and the communication system according to the invention benefit from the same advantages as the transmission method and the communication device according to the invention.

It is also possible to envision, in other embodiments, that the transmission method, the estimation method, the communication device and the communication system according to the invention have in combination all or part of the aforementioned features.

BRIEF DESCRIPTION OF THE DRAWINGS

Other features and advantages of the present invention will become apparent from the description given below, with reference to the appended drawings which illustrate an exemplary embodiment thereof devoid of any limitation. In the figures.

DETAILED DESCRIPTION OF THE INVENTION

Figure 1:
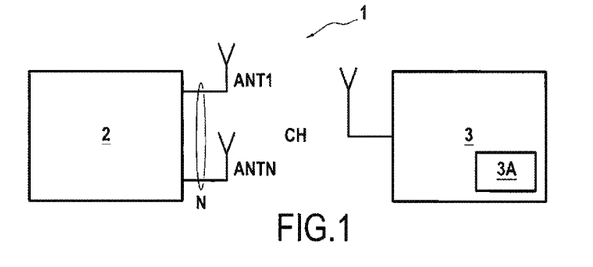
FIG. 1 shows a communication system in accordance with the invention in a particular embodiment.

FIG. 1 shows, in its environment, a communication system 1 in accordance with the invention in a particular embodiment.

In the example envisioned in FIG. 1, the communication system 1 is part of a network of mobile telecommunications operating according to a time-domain duplexing mode (or TDD). It comprises a first communication device 2, in accordance with the invention, and a second communication device 3. The first communication device 2 is for example a mobile terminal, such as a smartphone or a laptop computer, and the second communication device 3 is a base station of the mobile telecommunications network.

These examples are of course given solely by way of illustration and the invention is applicable to other communication devices.

In the embodiment described here, the first communication device 2 is equipped with a plurality of antennas, and more precisely N antennas ANT1, ANT2 . . . , ANTN, N denoting an integer greater than or equal to 2, that it can use interchangeably here to emit and receive data, particularly intended for and coming from the second communication device. It is moreover supposed, for the sake of simplicity, that the second communication device 3 possesses a single antenna.

The first and the second communication device are separated by a transmission channel denoted CH which is of interest as regards the estimation of the coefficients used to model it in the manner known per se. In the example envisioned here, the channel CH is in the first communication device 2 to second communication device 3 direction with multiple inputs and single output (also denoted as MISO for Multiple Input Single Output, and with a single input and multiple outputs (also denoted as SIMO for Single Input Multiple Output) in the second communication device 3 to first communication device 2 direction. In a variant, the channel CH may be a channel with multiple inputs and outputs (or MIMO for Multiple Input Multiple Output).

As mentioned previously, due to the TDD mode adopted by the communication system 1, an assumption of reciprocity of the transmission channel can be made: this means that the coefficients of the transmission channel in the first communication device 2 to second communication device 3 direction are considered as identical to the coefficients of the transmission channel in the second communication device 3 to first communication device 2 direction. It is here supposed that the estimation of the transmission channel CH separating the first communication device 2 from the second communication device 3 is carried out by the second communication device 3. No limitation is attached to the use that the second communication device 3 makes of this estimation (for example, it can be used to derive the coefficients of a precoder used by the second communication device 3 to send data to the first communication device 2, or for any other application as described previously).

Figure 2:
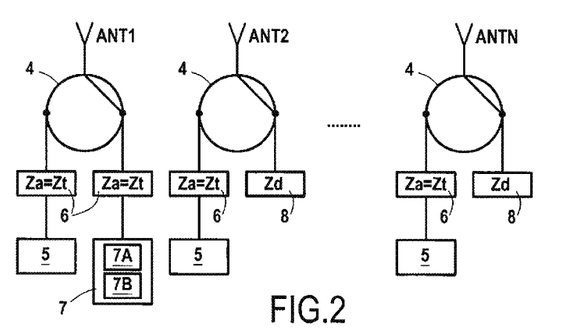
FIG. 2 shows a configuration of the antennas of a first communication device in accordance with the invention belonging to the system of FIG. 1.

FIG. 2 schematically represents the configuration of the antennas of the first communication device 2 in the particular embodiment considered here.

Each antenna ANTn, n=1, . . . , N of the first communication device 2 comprises a ground plane (not represented in the figure) and is connected, here by way of a switch 4, to an RF reception chain 5 located between the antenna ANTn and its ground plane, known per se and not described here. Between the RF reception chain 5 and the antenna ANTn is located an impedance matcher 6 which makes it possible to match the impedance of the antenna ANTn to the impedance of the reception chain 5. Such a component, which takes the form of an electrical circuit, is known per se and is not described in further detail here; its function is to transform by way of a load the impedance of the antenna ANTn into a conjugate impedance of the impedance of the reception chain 5 to maximize the power transmitted between the antenna ANTn and the reception chain 5. In the remainder of the text Za will denote the matching impedance of the antenna ANTn. For the sake of simplicity, it is supposed here that all the antennas of the first communication device 2 are identical and have the same matching impedances. Note that in practice, the matching impedances may differ from one antenna to the other, particularly if they have different shapes or sizes. No limitation is attached here to the shape, the size or even the nature of the antennas, the latter being able to be of any kind whatsoever.

In the remainder of the description, when the impedance of the antenna ANTn is matched by means of the impedance matcher 6 for example, it is said that the antenna ANTn is set to its matching impedance.

Moreover, in accordance with the invention, a single one of the antennas ANtn, n=1, . . . , N of the first communication device 2 is connected, by way of the switch 4, to an RF transmission chain 7. The RF transmission chain 7 notably comprises here an RF wave generator 7A, able to emit RF waves (RF signals) bearing the data that the first communication device 2 wishes to transmit over the mobile telecommunications network, and an RF amplifier 7B.

In the example illustrated in FIG. 2, it is supposed that only the antenna ANT1 is connected to the RF transmission chain 7: in other words, in this configuration, only the antenna ANT1 is strictly speaking active in transmission, i.e. capable of generating via the RF wave generator 7A and amplifying by way of the RF amplifier 7B a radio signal conveying data. This example is of course given solely by way of illustration, and any other antenna of the first communication device may be chosen alternatively to be linked to the transmission chain 7 and thus be active in transmission.

All the other antennas ANT2, . . . , ANTN of the first communication device 2 are contrary to the antenna ANT1, passive in transmission, i.e. they are not linked (or connected) to any active RF transmission chain generating RF signals. In accordance with the invention, each passive-in-transmission antenna of the first communication device 2 can be set in two different configurations which have an effect on its radiation and the way in which it rescatters the incident waves. This setting is done by acting on (and more precisely by modifying) the impedance of the passive antenna by means of a component or an appropriate electrical circuit placed at the input of the passive antenna.

More precisely, each passive-in-transmission antenna can be set either to a so-called transparency impedance denoted Zt (i.e. its impedance is modified by way of the electrical circuit to obtain an equivalent impedance equal to the transparency impedance Zt), or to a so-called scattering impedance denoted Zd (i.e. its impedance is modified by way of the electrical circuit to obtain an equivalent impedance equal to the scattering impedance Zd). This setting is done, in the embodiment described here, by way of the switch 4 as described in more detail below.

The transparency impedance Zt of an antenna ANTn, n=2, . . . , N is chosen such that when the antenna ANTn is set to this transparency impedance, the signal (i.e. the received incident wave) received by this antenna ANTn coming from the active antenna ANT1 when the latter transmits data over the mobile telecommunications network, is mostly if not entirely absorbed by the antenna ANTn and therefore consequently re-radiated little or not at all by the antenna ANTn. Note that the level of the signal received by the antenna ANTn corresponding to the signal emitted by the antenna ANT1 is proportional to the coupling between the antennas ANT1 and ANTn. In other words, when the antenna ANTn is set to its transparency impedance, the signal backscattered by this antenna ANTn is negligible or even zero, and under any circumstances less than a certain threshold (first threshold within the meaning of the invention). Note that this threshold can be implicit insofar as the backscattered signal is minimal.

An example of such a transparency impedance is the matching impedance of the antenna ANTn previously described, which makes it possible to obtain a signal backscattered by the antenna ANTn that is minimal. In the embodiment described here, the transparency impedance Zt of the passive antenna ANTn, n=2, . . . N is thus chosen equal to the matching impedance Za of the antenna ANTn: the antenna ANTn can in this way be easily set to its transparency impedance Za by toggling the switch 4 to the reception chain 5 associated with the antenna ANTn. It should be noted that this setting of the antenna to its matching impedance is the usual setting conventionally adopted when antennas are used.

The scattering impedance Zd of an antenna ANTn, n=2, . . . N is on the contrary chosen such that, when the antenna ANTn is set to this scattering impedance, the signal (i.e. the received incident wave) received by this antenna ANTn coming from the active antenna ANT1 when the latter transmits data over the mobile telecommunications network, is mostly if not entirely rescattered, i.e. reflected and re-radiated by the antenna ANTn. In other words, when the antenna ANTn is set to its scattering impedance, the signal backscattered by this antenna ANTn is non-negligible or even maximal, and in all cases greater than a certain threshold (second threshold within the meaning of the invention, greater than the first threshold). Note that this threshold can be implicit insofar as the backscattered signal is maximal.

In a known manner, the level of the signal backscattered by the antenna ANTn is proportional to the mismatching of the impedance of the antenna ANTn. To set the antenna ANTn to its scattering impedance Zd, the antenna ANTn is thus here linked, by way of the switch 4, to a component or electrical circuit 8 which makes it possible by way of a load to modify the impedance of the antenna ANTn, n=2, ..., N with a view to mismatching it. This component or electrical circuit 8 operates in a similar way to the impedance matcher 6 in the sense that it is used at the input of the antenna ANTn to modify its impedance; it is however configured to modify this impedance not into the matching impedance Za but into the scattering impedance Zd. In the example envisioned here of an antenna ANTn linked to a ground plane via an RF circuit, a simple way of mismatching the impedance of the antenna ANTn and maximizing the signal rescattered by the antenna ANTn is to choose a component 8 forming an open circuit or making a short-circuit at the access to the passive antenna ANTn (in other words, equivalent to an infinite or zero impedance load placed at the input of the passive antenna ANTn).

Note that with an open circuit or a short-circuit at the input of the passive antenna ANTn, the signal rescattered by the passive antenna ANTn is then proportional to the coefficient of transmission between the antenna ANT1 and the antenna ANTn weighted by its radiative efficiency. By way of illustration, in a mobile telecommunications context, the level of the signal thus rescattered is generally less than (−15) dB with respect to the signal emitted by the antenna ANT1.

Furthermore, for the sake of simplicity, it is supposed here that all the antenna of the first communication device are identical and radiate in one and the same frequency band, and the transparency and scattering impedances are considered identical for each of them. In a variant, the transparency and scattering impedances may differ from one antenna to another and in particular depend on the shape, size etc. of the antennas.

Moreover, in the embodiment described here, transparency and scattering impedances are chosen that lead respectively to a signal backscattered by the passive antenna ANTn, n=2, ..., N that is minimal or maximal given the antenna under consideration. As mentioned previously, according to this assumption, it is still possible to define thresholds, even arbitrary, such that the backscattered signal is less than or greater than these thresholds. Note that those skilled in the art, according to the nature of the antenna under consideration, would without difficulty know how to determine what impedances to consider to obtain a signal backscattered by the passive antenna or antennas, which is sometimes minimal and sometimes maximal. Thus, for example for an antenna of waveguide type, the transparency and scattering impedances may be obtained with a matched load and with a zero or infinite load respectively. For an antenna powered in differential mode such as an antenna of dipole type, the transparency and scattering impedances may be obtained with a zero load and with a non-zero load, preferably infinite, respectively.

As a variant, a different choice of the transparency and scattering impedances (i.e. not necessarily leading to a sometimes minimal, sometimes maximal backscattered signal) may be envisioned. Preferably however, it will be ensured that the separation between the backscattered signal levels according to whether the passive antenna is set to its transparency impedance or to its scattering impedance is large enough to be usable by the second communication device. For example, the scattering impedance and transparency impedance of a passive antenna may be chosen such that the difference between the level (or Ia power) of the signal backscattered by the passive antenna set to its transparency impedance is greater than a level of estimation noise of the transmission channel at the second communication device 3.

Figure 3:
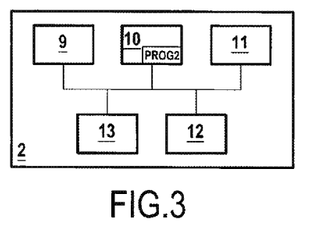
FIGS. 3 and 4 schematically represent the hardware architecture of the first communication device of FIG. 2 and a second communication device of the system of FIG. 1, in a particular embodiment.

In the embodiment described here, the first communication device 2 is a mobile terminal that has the hardware architecture of a computer as schematically represented in FIG. 3.

It particularly comprises a processor 9, a read-only memory 10, a non-volatile memory 11, a random access memory 12, and communication means 13. These communication means 13 also particularly comprise the antennas ANT1, ..., ANTN of the communication device 2, the switches 4, the transmission and reception chains 5 and 7 and the electrical circuits 6 and 8 previously described. They thus allow the first communication device 2 to communicate over the mobile telecommunications network and with the second communication device 3 in particular.

The read-only memory 10 of the first communication device 2 constitutes a recording medium in accordance with the invention, readable by the processor 9 and on which is recorded a computer program PROG2 in accordance with the invention, including instructions for executing a transmission method according to the invention. The program PROG2 particularly comprises instructions for controlling the hardware elements of the first communication device 2, and in particular its communication means 13 and the components of these communication means 13 (antennas, switches, electrical circuits etc.) These control instructions make it possible to configure or activate the communication means 13 to implement the transmission method according to the invention, as will be further detailed below.

Figure 4:
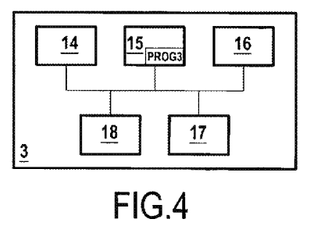

In the embodiment described here, the second communication device 3 is a base station, which itself has the hardware architecture of a computer as schematically represented in FIG. 4.

It particularly comprises a processor 14, a read-only memory 15, a non-volatile memory 16, a random access memory 17, and communications means 18. These communications means 18 particularly comprise the antenna (or antennas) of the communication device 3, as well as the transmission and reception chains intended to be linked to these antennas. They thus allow the second communication device 3 to communicate over the mobile telecommunications network and with the first communication device 2 in particular.

The read-only memory 15 of the second communication device 3 constitutes a recording medium readable by the processor 14 and on which is recorded a computer program PROG3 including instructions for executing an estimation method according to the invention. The program PROG3 particularly defines instructions for controlling the hardware elements of the second communication device 3, and in particular its communication means 18 and the components of these communication means 18, as well as an estimation module 3A of the transmission channel CH, further detailed below.

In accordance with the invention, the estimation of the transmission channel CH is carried out by the estimation module 3A of the second communication device 3 on the basis of pilot symbols transmitted by the first communication device 2. To allow the estimation module 3A to estimate the transmission channel between each of the antennas ANTn, n=1, . . . , N of the first communication device 2 and its antenna, sequences of pilot symbols known both to the first and the second communication device are emitted by the first communication device 2 for each of its antennas ANT1, . . . , ANTN. $a_n$ denotes the sequence of pilot symbols associated with the antenna ANTn, n=1, . . . , N of the first communication device 2. Each sequence of pilot symbols $a_n$ is here a complex column vector of dimension $L_n$, $L_n$ denoting an integer greater than 1. Each pilot symbol of the sequence a is a symbol taken from a finite constellation of a modulation M. M is for example here a QPSK (Quadrature Phase Shift Keying) modulation; the invention is however applicable to other modulations.

For the sake of simplicity, it is supposed here that all the sequences of pilot symbols associated with the different antennas ANTn, n=1, . . . , N of the first communication device 2 are of the same length L. However, in a variant, different lengths may be envisioned. Moreover, a single sequence of pilot symbols is considered here to estimate the transmission channel between an antenna ANTn, n=1, . . . , N of the first communication device 2 and the antenna of the communication device 3.

In a variant, several pilot sequences may be considered for each antenna (to benefit from redundancy for example).

Furthermore, as mentioned previously, a single antenna is envisioned here at the second communication device 3. The invention is however applicable to any number of antennas at the second communication device 3, the operation described below for the single antenna of the second communication device 3 being replicated for each of its antennas.

Figure 5:
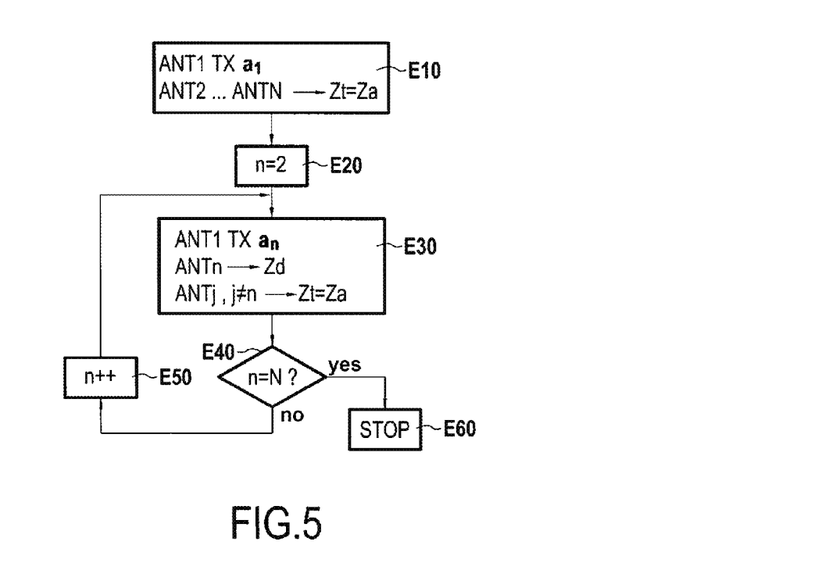
FIG. 5 shows, in the form of a flowchart, the main steps of a transmission method as implemented in a particular embodiment by the first communication device of the system of FIG. 1.

We will now describe in more detail, with reference to FIG. 5, the different steps of the transmission method according to the invention implemented in a particular embodiment by the first communication device 2 to transmit to the second communication device 2 the pilot symbols associated with its different antennas ANT1, . . . , ANTN, and thus allow the second communication device 2 to estimate the channel CH.

In the example envisioned here, the first communication device 2 possessing N antennas ANT1, . . . , ANTN, N sequences $a_n$, n=1, . . . , N of pilot symbols are transmitted by the first communication device 2 to the second communication device 3 to allow it to estimate the channel CH. These sequences of pilot symbols are conveyed by signals emitted by the first communication device 2 via its antennas. In the embodiment described here, time-domain multiplexing of the pilot symbol sequences is envisioned, i.e. each pilot symbol sequence associated with an antenna is emitted during a distinct time interval, without any overlap between the time intervals allocated to the different antennas. This assumption is however not limiting per se, and frequency-domain multiplexing or time and frequency multiplexing may be envisioned as a variant.

More precisely, in the embodiment described here, the first communication device 2 first emits, via its active transmission antenna ANT1, a signal (i.e. a wave) conveying the pilot symbol sequence $a_1$ associated with it (step E10). For this purpose, the active antenna ANT1 is switched to the transmission chain 7 (i.e. connected to it) by way of its switch 4, and the signal conveying the pilot symbol sequence $a_1$ associated therewith is generated by the RF generator 7A and amplified by the RF amplifier 7B before being transmitted strictly speaking by the active antenna ANT1 over the transmission channel CH to the second communication device 3.

For the entire duration P1 of this transmission, in accordance with the invention, the passive antennas ANT2, . . . , ANTN are set, by means of their switch 4, to their transparency impedance (in other words here to their matching impedance Za). In the embodiment described here, this setting consists in sending an instruction to each switch 4 of each passive antenna so that it switches to the reception chain 5. This setting makes it possible to match by means of the impedance matcher 6 each passive antenna ANTn, n= 2, . . . N. In this way, the signal received by each passive antenna ANTn, n=2, . . . N which is proportional to the coupling between the active antenna ANT1 and each passive antenna ANTn, n=2, . . . N, is absorbed by the passive antenna ANTn and re-radiated little or not at all. As a result the signal received by the second communication device 3 may be written in the form:

$$y_1 = a_1 h_1 + n_1$$

where $n_1$ denotes a complex column vector of dimension $L_1$=L characterizing the noise and interferences introduced by the channel, and $h_1$ denotes the coefficient of the channel between the active antenna ANT1 and the antenna of the communication device 3. For the sake of simplicity, it is supposed that the channel is a channel with flat fading and a single coefficient is considered here for each antenna. The invention is however applicable to other types of channel and particularly to multi-path channels. Note that in practice, even when matched, each passive antenna re-scatters part of the incident wave it has received from the active antenna ANT1, such that the signal $y_1$ contains a contribution of each of the passive antennas ANT2, . . . , ANTN. This contribution is however negligible with respect to the level of the direct signal transmitted from the active antenna ANT1 and is implicitly included in the convention adopted above in the coefficient $h_1$.

Then, in accordance with the invention, the first communication device 2 then successively transmits, during time intervals of respective durations Pn, n=2, . . . , N (avec P1=P2= . . . =PN in the example envisioned here), the various pilot symbols $a_n$ respectively associated with the passive antennas ANT2 . . . ANTN of the first communication device 2 (steps E20 and E40-E60).

More precisely, during each time interval of duration Pn, n=2, . . . , N, the first communication device 2 emits, via its active transmission antenna ANT1, a signal (i.e. a wave) conveying the sequence of pilot symbols $a_n$ associated with the passive antenna ANTn (step E30). For this purpose, the active antenna ANT1 is maintained on the transmission chain 7 by way of its switch 4, and the signal conveying the sequence of pilot symbols an associated with the passive antenna ANTn (i.e. allowing the communication device 3 to estimate the channel between the passive antenna ANTn and its antenna) is generated by the RF generator 7A and amplified by the RF amplifier 7B before being transmitted strictly speaking by the active antenna ANT1 over the transmission CH to the second communication device 3.

For the entire duration Pn of this transmission, in accordance with the invention, the passive antenna ANTn is set, by means of its switch 4, to its scattering impedance Zd.). In the embodiment described here, this setting consists in sending an instruction to the switch 4 of the passive antenna ANTn so that it switches to the electrical circuit 8. This setting makes it possible to switches the antenna ANTn to its scattering impedance Zd. Thus configured, the passive antenna ANTn reflects the signal received from the active antenna ANT1 conveying the pilot symbols of the sequence an.

Note that for the sake of simplicity, it is supposed here that all the antennas ANTn, n=1, . . . , N of the first communication device 2 radiate (and therefore rescatter) in one and the same frequency band. However this assumption is not limiting per se and the invention is also applicable when distinct frequency bands are envisioned (in which case, the signal emitted by the active antenna ANT1 carrying the pilot symbol sequence associated with a passive antenna is emitted by the active antenna ANT1 in the frequency band in which the passive antenna backscatters).

When the first communication device 1 disposes of several passive antennas, i.e. for N greater than 2, the distinct passive antennas of the passive antenna ANTn (in other words the antennas ANTj, j=2, . . . , N with j≠n), are set during the transmission of the sequence of pilot symbols $a_n$ by the active antenna ANT1 to their transparency impedances Zt=Za, such that only the passive antenna ANTn backscatters the incident wave coming from the active antenna ANT1. In other words, a single passive antenna backscatters both during one and the same time interval and in one and the same determined frequency band.

This setting of the passive antennas ANTj, j=2, . . . , N with j≠n is carried out here by sending an instruction to each switch 4 of each passive antenna ANTj so that it switches to the reception chain 5. This setting makes it possible to match by means of the impedance matcher 6 each passive antenna ANTj, j=2, . . . , N with j≠n. In this way, the signal received by each passive antenna ANTj, j=2, . . . , N with j≠n which is proportional to the coupling between the active antenna ANT1 and the passive antenna ANTj, is absorbed by the passive antenna ANTj and radiated little or not at all.

The signal received by the second communication device 3 can then be written in the form:

$$y_n = a_n h_1 + a_n h_n + n_n$$

where $n_n$ denotes a complex column vector of dimension $L_n = L$ characterizing the noise and the interferences introduced by the channel, and $h_n$ denotes the coefficient of the channel between the passive antenna ANTn and the antenna of the communication device 3. As mentioned previously, the coefficient $h_n$ implicitly includes the contributions of the other passive antennas although they are negligible with respect to the direct signal emitted by the active antenna ANT1 and the signal backscattered by the passive antenna.

The first communication device 2 reiterates the step E30 for all its passive antennas (steps of testing E40, iteration E50 of the index n and stopping E60 when all the sequences of pilot symbols an for n=1, . . . , N have been transmitted). It goes without saying that a different order than the chronological order adopted here may be considered for sending the pilot signal associated with the different antennas of the first communication device 2.

As mentioned previously, in the embodiment described here, time-domain multiplexing of the pilot symbol sequences is implemented by the first communication device 1, i.e. the signals conveying the pilot symbols associated with the passive antennas are transmitted by the active antenna ACT1 during separate time intervals. Another type of multiplexing may however be envisioned as a variant by the first communication device 1. For example at least two signals conveying pilot symbols associated with two distinct passive antennas may be transmitted by the active antenna ANT1 in separate frequency bands (frequency multiplexing). Furthermore, these signals may be transmitted during time intervals overlapping one another or not.

On the basis of the different signals $y_1, \ldots, y_n$, received by the second communication device 3, the latter can estimate the transmission channel CH i.e. the coefficients $h_1, \ldots, h_N$ of the channel CH.

Figure 6:
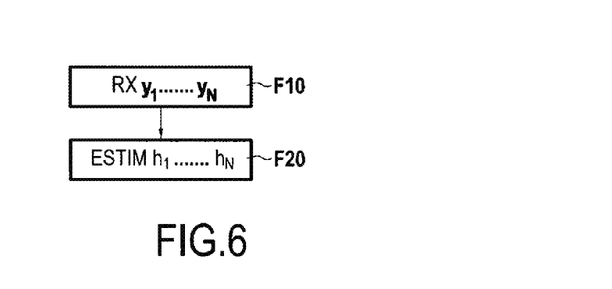
FIG. 6 shows, in the form of a flowchart, the main steps of an estimation method as implemented in a particular embodiment by the second communication device of the system of FIG. 1.

FIG. 6 represents the different steps of the estimation method according to the invention implemented in a particular embodiment by the second communication device 3 to estimate these coefficients.

It is therefore supposed that the second communication device 3 has received via its antenna and its communication means 18, the signals $y_1, \ldots, y_n$ previously described (step F10). These signals may be written in the form:

$$\begin{bmatrix} y_1 \\ y_2 \\ \vdots \\ y_N \end{bmatrix} = \begin{bmatrix} a_1 & 0 & \cdots & 0 \\ a_2 & a_2 & \cdots & 0 \\ \vdots & \vdots & \vdots & \vdots \\ a_N & 0 & \cdots & a_N \end{bmatrix} \begin{bmatrix} h_1 \\ h_2 \\ \vdots \\ h_N \end{bmatrix} + \begin{bmatrix} n_1 \\ n_2 \\ \vdots \\ n_N \end{bmatrix}$$

In the remainder of the text A denotes the matrix of dimensions T×N, where T denotes the total number of pilot symbols transmitted by the active antenna ANT1 associated with the N antennas of the first communication device 2 (T=NL here), or:

$$A = \begin{bmatrix} a_1 & 0 & \cdots & 0 \\ a_2 & a_2 & \cdots & 0 \\ \vdots & \vdots & \vdots & \vdots \\ a_N & 0 & \cdots & a_N \end{bmatrix}$$

The matrix A contains in the first column the T=N·L pilot symbols transmitted by the active antenna ACT1 (i.e. contained in the sequences $a_1, \ldots, a_N$ and in its other columns the pilot symbols backscattered the passive antennas ANTn, n=2, . . . , N of the first communication device 2.

The second communication device 3 then estimates the coefficients $h_1, \ldots, h_N$ of the channel CH on the basis of the signals $y_1, \ldots, y_n$ received (step F20), via its estimation module 3A.

For this purpose, different estimation algorithms may be implemented by the estimation module 3A.

For example, the estimation module 3A may envision an estimation algorithm of ZF (Zero Forcing) type which does not require any knowledge of the covariance matrix of the noise or of the covariance matrix of the channel. It is supposed here that for this purpose the matrix $A^1 A$ is invertible, [1] denoting the Hermitian operator. It should be noted that this assumption can be verified via an appropriate choice of the pilot symbols used to form the sequences $a_1, \ldots, a_N$. These pilot symbols being predetermined to be known both to the first communication device 2 and to the second communication device 3, it does not pose any difficulty to choose these symbols so that they obey the condition described above.

Note that to limit the estimation noise at the second communication device 3, it is moreover possible to choose the pilot symbols so as to minimize the trace of the inverse of the matrix $A^1 A$.

For example one may choose $a_n = a$ whatever n=1, . . . , N, with a comprising L complex symbols belonging to the constellation of the modulation M and verifying $a^1 a = L$. In this case, the matrix $A^1 A$ is of full rank, which makes it possible to compute its inverse. For example, for N=3, the inverse of the matrix $A^\dagger A$ is equal to:

$$(A^\dagger A)^{-1} = \frac{1}{L}\begin{bmatrix} 1 & -1 & -1 \\ -1 & 2 & 1 \\ -1 & 1 & 2 \end{bmatrix}$$

the estimation noises on the components $h_1$, $h_2$, $h_3$ being equal to $$\frac{\sigma^2}{L}, \frac{2\sigma^2}{L}, \frac{2\sigma^2}{L}$$

for a covariance matrix of the noise of the form $\sigma^2 I$ where I denotes the identity matrix.

The estimation of the coefficients $h_1, \ldots, h_N$ of the channel CH can then be carried out by the estimation module 3 by multiplying the vector of the received signals $$\begin{bmatrix} y_1 \\ y_2 \\ \vdots \\ y_N \end{bmatrix}$$

by the matrix $(A^\dagger A)^{-1} A^\dagger$ in a manner known per se.

As a variant, an LMMSE (Linear Minimum Mean Square Error) algorithm may be applied by the estimation module 3A. This algorithm consists in multiplying the vector of the signals received $$\begin{bmatrix} y_1 \\ y_2 \\ \vdots \\ y_N \end{bmatrix}$$

by the matrix $R_h A^\dagger (A R_h A^\dagger + R_n)^{-1}$, where $R_h$ denotes the covariance matrix of the channel CH and R the covariance matrix of the noise and the interference. A diagonal matrix may be further applied following this matrix to obtain an unbiased estimator.

Of course these examples of estimators are given solely by way of illustration and other estimators may be used by the estimation module 3A.

Note that as seen previously, according to the estimator used, conditions may be required for the choice of the pilot symbols. This may also have an influence on the sequencing by the first communication device 2 of the signals conveying the pilot symbols. Preferably, the pilot symbol sequences and their sequencing in time and/or in frequency will be chosen so as to minimize the level of estimation noise of the transmission channel at the second communication device 3.

The invention claimed is:

1. A method of transmission, by a first communication device, of pilot symbols to allow a second communication device to estimate a transmission channel between the first and the second communication device, the first communication device comprising a first antenna configured so as to be active in transmission and at least a second antenna configured so as to be passive in transmission, said method comprising:
transmitting, by the first active antenna, at least one signal conveying pilot symbols associated with said first active antenna, and during which said at least one second passive antenna is set to a transparency impedance, said transparency impedance being chosen so as to obtain a first level of signal backscattered by said at least one second passive antenna in which the first level of signal is less than a first threshold; and
at least one implementation of transmitting by the first active antenna at least one signal conveying pilot symbols associated with said at least one second passive antenna, and during which said at least one second passive antenna is set to a scattering impedance chosen so as to obtain a second level of signal backscattered by said at least one second passive antenna in which the second level of signal is greater than a second threshold, and wherein the second threshold is greater than the first threshold.

2. The method as claimed in claim 1 wherein the first communication device comprises a plurality of second passive antennas, and during said at least one implementation of transmitting, the plurality of second passive antennas are set such that a single one of the plurality of second passive antennas backscatters both during one and the same time interval and within one and the same determined frequency band.

3. The method as claimed in claim 2 wherein when during implementation of one of the at least one implementation of transmitting, the first active antenna transmits said at least one signal conveying the pilot symbols associated with one of said plurality of second passive antennas, and the other second passive antenna or antennas of the first communication device are set to their transparency impedances.

4. The method as claimed in claim 2 wherein the signals conveying the pilot symbols associated with said plurality of second passive antennas are transmitted by the first active antenna during separate time intervals.

5. The method as claimed in claim 1 wherein the pilot symbols transmitted by the first active antenna are chosen such as to minimize a level of estimation noise of the transmission channel at the second communication device.

6. The method as claimed in claim 1 wherein:
the pilot symbols transmitted by the first active antenna are chosen such that, if A denotes a matrix of dimensions T×N, where N is the number of antennas of the first communication device, T is the total number of pilot symbols transmitted by the first active antenna associated with the N antennas of the first communication device, and said matrix A contains in a column the T pilot symbols transmitted by the first active antenna and in its other column or columns the pilot symbols backscattered by said at least one second passive antenna, the matrix $A^\dagger A$ is invertible, $^\dagger$ denoting the Hermitian operator.

7. The method as claimed in claim 6 wherein the pilot symbols transmitted by the first antenna are chosen to minimize the trace of the inverse matrix of the matrix $A^\dagger A$.

8. The method as claimed in claim 1 wherein the transparency impedance of at least one of the at least one second passive antenna of the first communication device is chosen equal to a matching impedance of this passive antenna.

9. The method as claimed in claim 1 wherein the scattering impedance of at least one of the at least one second passive antenna of the first communication device is obtained by linking said passive antenna to a zero or infinite impedance load.

10. The method as claimed in claim 1 wherein the scattering impedance and the transparency impedance of the at least one second passive antenna are chosen such that a difference between the first level of the signal backscattered by the second passive antenna set to its scattering impedance and the second level of the signal backscattered by the second passive antenna set to its transparency impedance is greater than a level of estimation noise of the transmission channel at the second communication device.

11. The method as claimed in claim 1 wherein the first communication device comprises a plurality of second passive antennas, and wherein at least two signals conveying pilot symbols associated with two distinct second passive antennas are transmitted by the first active antenna in separate frequency bands.

12. The method as claimed claim 11 wherein said at least two signals are transmitted by the first active antenna during overlapping time intervals.

13. A method of estimation of a transmission channel between a first multi-antenna communication device and a second communication device, said method being implemented by the second communication device and comprising, for at least one antenna of the second communication device:
receiving by said at least one antenna a plurality of signals transmitted by the first communication device and conveying pilot symbols, the first communication device comprising a first antenna configured to be active in transmission and at least a second antenna configured to be passive in transmission, the received plurality of signals comprising:
at least one signal conveying pilot symbols, transmitted by and associated with the first active antenna, and during which said at least one second passive antenna was set to a transparency impedance, said transparency impedance being chosen to obtain a first level of signal backscattered by said at least one second passive antenna in which the first level of signal is less than a first threshold; and
at least one signal conveying pilot symbols transmitted by the first active antenna and associated with said at least one second passive antenna, and during which said at least one second passive antenna was set to a scattering impedance chosen to obtain a second level of signal backscattered by said at least one second passive antenna in which the second level of signal is greater than a second threshold, and wherein the second threshold is greater than the first threshold; and
estimating the transmission channel between the antennas of the first device and said antenna of the second communication device using the pilot symbols conveyed by said received signals.

14. A first communication device, configured to transmit pilot symbols to allow a second communication device to estimate a transmission channel between the first and the second communication device, the first communication device comprising:

a first antenna configured to be active in transmission; and
at least one second antenna configured to be passive in transmission, said first active antenna being further configured to:
transmit at least one signal conveying pilot symbols associated with said first active antenna, said at least one second passive antenna being then set to a transparency impedance, this transparency impedance being chosen so as to obtain a first level of signal backscattered by said at least one second passive antenna in which the first level of signal is less than a first threshold; and
transmit at least one signal conveying pilot symbols associated with said at least one second passive antenna, said at least one second passive antenna being then set to a scattering impedance chosen so as to obtain a second level of signal backscattered by said at least one second passive antenna in which the second level of signal is greater than a second threshold, and wherein the second threshold is greater than the first threshold.

15. A communication system comprising:
a first multi-antenna communication device, configured to transmit pilot symbols to allow a second communication device to estimate a transmission channel between the first and the second communication device, the first communication device comprising:
a first antenna configured to be active in transmission; and
at least one second antenna configured to be passive in transmission, said first active antenna being further configured to:
transmit at least one signal conveying pilot symbols associated with said first active antenna, said at least one second passive antenna being then set to a transparency impedance, this transparency impedance being chosen so as to obtain a first level of signal backscattered by said at least one second passive antenna in which the first level of signal is less than a first threshold; and
transmit at least one signal conveying pilot symbols associated with said at least one second passive antenna, said at least one second passive antenna being then set to a scattering impedance chosen so as to obtain a second level of signal backscattered by said at least one second passive antenna in which the second level of signal is greater than a second threshold, and wherein the second threshold is greater than the first threshold; and
the second communication device, which comprises at least one antenna to receive a plurality of signals transmitted by the first communication device and conveying pilot symbols, said second communication device further comprising a processor configured to estimate the transmission channel between the antennas of the first communication device and said at least one antenna of the second communication device using the pilot symbols conveyed by said received signals.

* * * * *